Oct. 13, 1936.   Z. C. BRADFORD   2,057,182

LUBRICATOR

Original Filed Feb. 11, 1932

Inventor
Zerbe C. Bradford
By Spencer, Hardman and Fehr
His Attorneys

Patented Oct. 13, 1936

2,057,182

UNITED STATES PATENT OFFICE 2,057,182

LUBRICATOR

Zerbe C. Bradford, Dayton, Ohio, assignor, by mesne assignments, to General Motors Corporation, Detroit, Mich., a corporation of Delaware Application February 11, 1932, Serial No. 592,292
Renewed July 29, 1935

20 Claims. (Cl. 308—36.1)

This invention relates to improvements in lubricating devices.

It is among the objects of the present invention to provide a machine having a rotating shaft, with a reservoir adapted to be supplied with fluid lubricant at the time of assembling the machine, which lubricant supply is sufficient properly to lubricate the rotating shaft of the machine over a substantially long period.

Another object of the present invention is to provide a machine with a lubricant reservoir from which the lubricant cannot escape regardless of the position of the machine, especially eliminating spilling of the lubricant due to careless handling of the machine during shipping.

A still further object of the present invention is to provide a lubricant conductor between the lubricant supply and the shaft supporting bearing of the machine, which conductor is adapted by capillary attraction to deliver lubricant from the reservoir to the shaft bearing in proper amounts.

Still another object of the present invention is to provide a duct between the shaft supporting bearing and the reservoir which is adapted to return to the reservoir excessive lubricant supply from the bearing, said duct however being so arranged that it will at no time transfer fluid from the reservoir to the bearing.

Further objects and advantages of the present invention will be apparent from the following description, reference being had to the accompanying drawing wherein a preferred embodiment of one form of the present invention is clearly shown.

Figure 1:
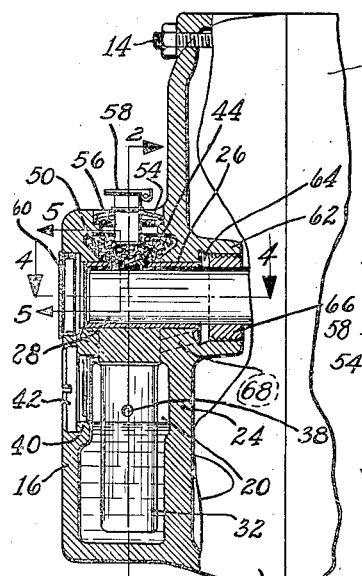
Fig. 1 is a fragmentary view of a machine having a rotating shaft, a certain portion of said machine being shown in section. This section is taken substantially along the line 1—1 of the Fig. 2.

Referring to the drawing, the machine designated by the numeral 10 is provided with an end housing 12 secured thereto by bolts 14. This end housing has an extension 16 providing two compartments 18 and 20, which are separated from each other by the wall 22 and from the interior of the machine by the wall 24 of the end housing 12. The end housing supports a bearing 26 substantially coaxially of the housing 12, this bearing extending through the compartment 18 and having apertures therein providing communication between the interior of the bearing and the said compartment. The rotating shaft 28 of the machine has one end journaled in this bearing. The other end of said shaft is journaled in a similar bearing provided at the opposite end of the housing in a manner similar to which bearing 26 is supported in the end housing 12. For the sake of brevity, only one end of the housing has been shown.

Figure 2:
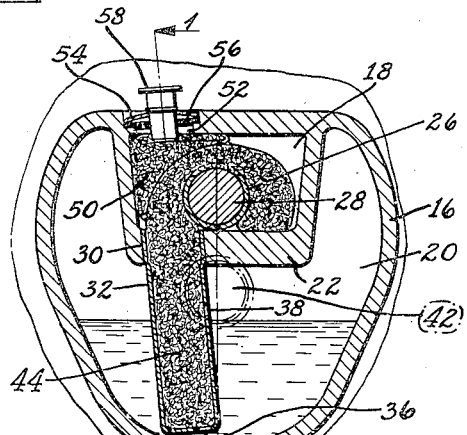
Fig. 2 is a transverse sectional view taken along the line 2—2 of Fig. 1.

Compartment 18 is in communication with the adjoining compartment 20 through an opening 30 in the wall 22 which separates these two compartments 18 and 20. One end of a tubular member 32 is press-fitted into this opening 30, the lower end of this tubular member being closed by the end wall 34 as shown in Fig. 2. This closed end of the tube lies adjacent the bottom of compartment 20 when the machine is in proper, upright position. This end wall of the tubular member 32 has a small orifice 36 which provides communication between compartment 20 and the interior of the tubular member 32. Another orifice 38 in the side wall of the tubular member 32 is arranged as close to the center of the compartment 20 as possible. One wall of the housing extension 16 of the end housing 12 has an opening 40 for receiving a sealing screw cap 42. In assembling the machine and before this screw cap is placed in this opening, lubricant is introduced into the compartment 20 until its level is flush with the bottom of the opening 40, after which the screw cap 42 is secured in said opening, thereby completely closing the compartment. The level of the lubricant so introduced into the compartment 20 is always below the orifice 38 in the side wall of the tubular member 32 regardless of the position of the machine, due to the fact that this side opening in the tubular member is substantially central of the compartment 20. In Fig. 2 the side opening is shown above the lubricant level when the machine is in proper, upright position, and in Fig. 3 the position of this side opening is shown relative to the lubricant level when the machine is completely inverted from its proper, upright position.

A lubricant conductor is provided within the tubular member 32, this conductor being in the form of a wick 44, one end of which engages the end wall 34 of the tubular member, the other end being looped over the shaft supporting bearing 26, said wick resting in the recesses in said bearing so that it actually engages the rotating shaft exposed by the opening in said bearing.

It may clearly be seen that lubricant within the compartment 20 will enter through the orifice 36 in the bottom closed end of the tubular member 32 and assume its level within said tubular member. The wick within said tubular member will, by capillary attraction, convey lubricant to exposed parts of the shaft in bearing 26, keeping this bearing properly lubricated.

In order to insure constant contact between the wick and the shaft, a fibrous packing 50 is inserted through an opening 52 in the end housing wall, this packing engaging the wick 44 and forcing it toward the apertured bearing 26 and against the shaft 28. The opening 52 is hermetically sealed by a disc 54 under which a fibrous packing washer 56 is placed. This disc supports an oiler 58 through which additional supplies of lubricant may be injected into the compartment 18 after the machine has been used sufficiently long to reduce the original supply within the compartment 20. The end of the shaft supporting bearing 26 is hermetically closed by a cover cap 60, preventing leakage of oil from the bearing 26.

From the above description it may be seen that the original lubricant supply within the compartment 20 is always beneath the vent hole or orifice 38 in the side of the tubular member 32 regardless of the position of the machine, said lubricant, however, being in proper position to be transmitted or transferred to the shaft supporting bearing via the conductor wick 44 when the machine is in proper upright position.

In the inside of the housing and substantially concentric of the shaft 28 there is provided an annular extending flange 62 providing a chamber 64. The shaft carries a ring 66 which rotates within the chamber 64, the outer peripheral edge of this ring has screw threads so designed that rotation of the shaft and the ring will tend to force any lubricant which may enter the said chamber from the bearing 26 back toward said bearing and thus prevent its leakage into the main housing of the machine. This chamber 64 is in communication with the end of the tubular member 32 which is press-fitted into the wall 22 through a duct 68 shown in dotted lines in Fig. 1 so that the lubricant within said chamber is conducted back to the wick via said duct, thereby preventing accumulation of any lubricant within said chamber.

Figure 3A:
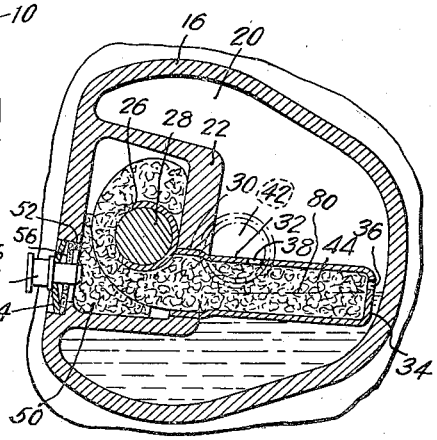
Fig. 3a is a view similar to Figs. 2 and 3, showing, however, part of the machine in an inverted position different from that shown in Fig. 3.
Figure 3:
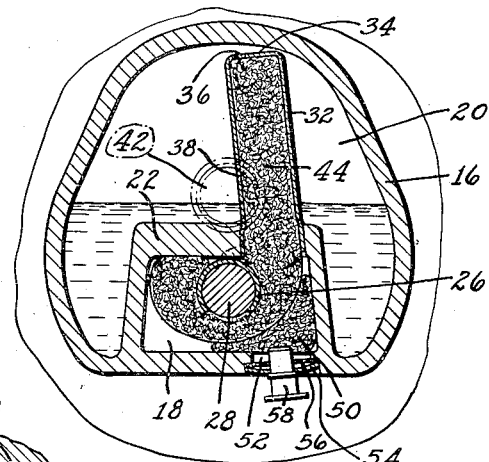
Fig. 3 is a view similar to Fig. 2, showing part of the machine in inverted position, however.
Figure 4:
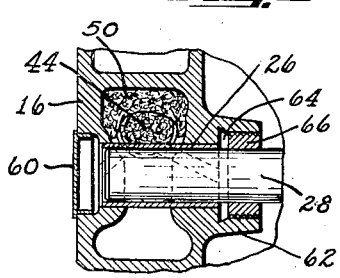
Fig. 4 is a fragmentary detail sectional view taken along the line 4—4 of Fig. 1.
Figure 5:
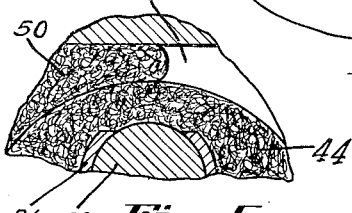
Fig. 5 is a detail sectional view on an enlarged scale, taken along the line 5—5 of Fig. 1.

As best shown in Fig. 3a, the shape of the compartment 20 which is determined by the confining walls, and the location of the tubular member 32 within said compartment 20 has been so selected that lubricant therein can enter through the orifice 36 only when that part of the tubular member 32 which is closest to the partition 22 or that part thereof which is closest to the end wall 34 forms a substantial angle with the level of the lubricant supply above and below the latter respectively, whereby no lubricant can enter through said orifice 36 and eventually flood wick 44 and the shaft bearing in any position of the housing. It will be noticed from Fig. 3a that in the illustrated position of the compartments 18 and 20 the maximum lubricant level 80 is just below the entrance orifice 36 and that said lubricant level 80 forms a slight angle above said lubricant level with that part of the tubular member 32 which is closest to the partition 22, however, this slight angle falls just short of permitting lubricant to enter said orifice 36. Any angle larger than that shown in Fig. 3a permits lubricant to enter through orifice 36, in which case however, no lubricant can flow into compartment 18.

Figure 6:
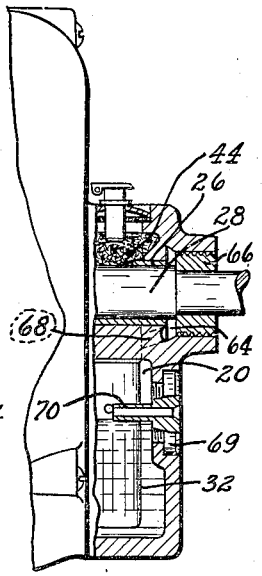
Fig. 6 is a view similar to Fig. 1, showing a modified form of the invention.

In Fig. 6 a modified form of construction is shown. The same compartments 18 and 20, the tubular member 32 and the lubricant transfer wick 44 are provided. In this instance the screw plug 42 is replaced by a member 69 having a pipe-like extension 70 which extends slightly below the center of the compartment 20. This pipe-like extension provides communication between the compartment 20 and the atmosphere. Lubricant may be introduced through said pipe-like extension 70 of member 69 or directly through the opening in the side wall of compartment 20 upon removal of member 69 therefrom. When the proper lubricant level is attained within compartment 20 the lubricant will leak out through said pipe-like extension indicating that said compartment contains the proper amount of lubricant. Due to the fact that the extension 70 extends slightly below the center of compartment 20, the proper amount of lubricant from the compartment 20 cannot leak out through said pipe-like extension regardless of the position of the machine. Although a vent hole is shown provided by the tubular member 32 in Fig. 6, it is well within the scope of the present invention to omit this vent hole, since the orifice of member 69 which extends substantially to the center of compartment 20 may also serve as a vent hole.

From the aforegoing it may be seen that applicant has provided a lubricating device for a machine having a rotating shaft supported in the bearings, said lubricating device having an initial supply of lubricant sufficient to provide lubrication for the machine over an extensive period without additional lubricant being added thereto, the device being so designed that the lubricant containing reservoir will retain the lubricant without substantial leaks, regardless of the position into which the machine is placed.

The lubricating device is also designed that it will function properly even though the machine is being operated in positions substantially askew from its proper upright position.

While the form of embodiment of the present invention as herein disclosed, constitutes a preferred form, it is to be understood that other forms might be adopted, all coming within the scope of the claims which follow.

What is claimed is as follows:

1. In a lubricating device, the combination of a chamber of such shape that the level of a predetermined maximum lubricant supply therein is maintained a substantially uniform distance below the center of the chamber regardless of the position of the device; a conduit providing the sole communication between the lubricant supply and the exterior of the chamber; and means providing a vent nearer the center of the chamber than the level of said maximum lubricant supply.

2. In a lubricating device, the combination of a chamber of such shape that the level of a predetermined maximum lubricant supply therein is maintained a substantially uniform distance below the center of the chamber regardless of the position of the device; a conduit providing the sole communication between the lubricant supply and the exterior of the chamber, said conduit extending into the chamber and having an entrance at such a location therein as to communicate with the lubricant supply substantially so long as the device is in such position that lubricant does not gravitate from the supply through said conduit; and means providing a vent nearer the center of the chamber than the level of said maximum lubricant supply.

3. In a lubricating device, the combination of a chamber of such shape that the level of a predetermined maximum lubricant supply therein is maintained a substantially uniform distance below the center of the chamber regardless of the position of the device; a tubular member secured to a wall of the chamber and extending into the chamber and having an entrance near a wall portion of the chamber most remote from that wall portion to which the tubular member is secured, said member providing the sole communication between the lubricant supply and the exterior of the chamber; and means providing a vent nearer the center of the chamber than the level of said maximum lubricant supply.

4. In a lubricating device, the combination of a chamber of such shape that the level of a predetermined maximum lubricant supply therein is maintained a substantially uniform distance below the center of the chamber regardless of the position of the device; a conduit providing the sole communication between the lubricant supply and the exterior of the chamber and having a vent nearer the center of the chamber than the level of said maximum lubricant supply; and means in said conduit for conveying lubricant.

5. In a lubricating device, the combination of a sealed lubricant chamber having a filler opening, the lubricant level in the chamber being below the center thereof; means for normally sealing said opening, said means providing also a vent extending substantially to the center of the chamber; and a conduit providing the sole communication between the lubricant supply and the exterior of the chamber.

6. In a lubricating device, the combination of a lubricant chamber having a filler opening and being of such shape that the level of a predetermined maximum lubricant supply therein is maintained a substantially uniform distance below the center of the chamber; means for normally sealing the filler opening, said means providing also a vent extending nearer the center of the chamber than the level of said maximum lubricant supply; and a conduit providing the sole communication between the lubricant supply and the exterior of the chamber.

7. In a lubricating device, the combination of a lubricant chamber having a filler opening and being of such shape that the level of a predetermined maximum lubricant supply therein is maintained a substantially uniform distance below the center of the chamber; means for normally sealing the filler opening, said means providing also a vent extending nearer the center of the chamber than the level of said maximum lubricant supply; and a conduit providing the sole communication between the lubricant supply and the exterior of the chamber, said conduit extending into the chamber and having an entrance at such a location therein as to communicate with the supply substantially so long as the device is in such position that lubricant from the supply does not gravitate through said conduit.

8. In a lubricating device, the combination of a lubricant containing chamber of such shape that the level of a predetermined maximum lubricant supply therein is maintained a substantially uniform distance below the center of the chamber regardless of the position of the device; lubricant introducing means carried by the chamber, said means permitting the introduction of lubricant only until the chamber contains said maximum supply; and means for conducting lubricant from the supply to the exterior of the chamber, said means providing a vent substantially in the center of the chamber.

9. In a lubricating device, the combination of a chamber containing a supply of lubricant; a conduit providing the sole communication between the lubricant supply and the exterior of the chamber; and lubricant introducing and venting means carried by the chamber, said means being located substantially in the center of the chamber and permitting the introduction of lubricant only so long as said chamber holds less than half its capacity, and said chamber being of such shape that the level of the maximum lubricant supply therein is maintained a substantially uniform distance below said means regardless of the position of the device.

10. In a lubricating device, the combination of of a chamber of such shape that the level of a predetermined maximum lubricant supply therein is maintained a substantially uniform distance below the center of said chamber regardless of the position of the device; a tubular member having an orificed bottom providing the sole communication between the lubricant supply and the exterior of the chamber, said tubular member being so located within the chamber that substantially an entire cross-sectional portion of said member is above the lubricant level regardless of the position of the device; and means providing a vent nearer the center of the chamber than the level of said maximum lubricant supply.

11. In a lubricating device, the combination of a chamber of such shape that the level of a predetermined maximum lubricant supply therein is maintained a substantially uniform distance below the center of said chamber regardless of the position of the device; a tubular member having an orificed bottom providing the sole communication between the lubricant supply and the exterior of the chamber and having a vent nearer the center of the chamber than said maximum lubricant supply, said tubular member being so located within the chamber that substantially an entire cross-sectional portion of said member is above the lubricant level regardless of the position of the device; and lubricant conveying means in the tubular member.

12. In a lubricating device, the combination of a chamber of such shape that the level of a predetermined maximum lubricant supply therein is maintained a substantially uniform distance below the center of said chamber regardless of the position of the device; a tubular member having an orifice bottom providing the sole communication between the lubricant supply and the exterior of the chamber, said tubular member being so located within the chamber that substantially an entire cross-sectional portion of said member is above the lubricant level regardless of the position of the device; and an orificed plug secured to a wall of the chamber and extending nearer the center of the chamber than the level of said maximum lubricant supply and serving as a vent and for limited introduction of lubricant.

13. In a lubricating device, the combination of a chamber of such shape that the level of a predetermined maximum lubricant supply therein is maintained a substantially uniform distance below the center of said chamber regardless of the position of the device; a tubular member having an orificed bottom providing the sole communication between the lubricant supply and the exterior of the chamber and having a vent nearer the center of the chamber than the level of said maximum lubricant supply, said tubular member being so located within the chamber that substantially an entire cross-sectional portion of said member is above the lubricant level regardless of the position of the device; lubricant conveying means in the tubular member; and an orificed plug secured to a wall of the chamber and extending nearer the center of the chamber than the level of said maximum lubricant supply but more remote from said center than the vent and serving for limited introduction of lubricant.

14. A lubricating device for a journal bearing comprising, in combination, a housing; a partition in said housing dividing the same into a main chamber containing a supply of lubricant and a secondary chamber and sealing one chamber with respect to the other chamber; a bearing in the secondary chamber; a tubular member having an open end secured in an opening of the partition, the other closed end of the tubular member dipping into the lubricant supply and having an orifice, said tubular member being provided with an opening in its annular wall adjacent the center of the main chamber and above the lubricant level therein; and a wick in the tubular member and extending into the secondary chamber for lubricating the bearing therein.

15. A lubricating device for a journal bearing comprising, in combination, a housing; a partition in the housing dividing the same into a main chamber containing a supply of lubricant and a secondary chamber and sealing one chamber with respect to the other chamber, the main chamber having a filler opening; a bearing in the secondary chamber; a tubular member having an open end secured in an opening of the partition, the other closed end of the tubular member dipping into the lubricant supply and having an orifice; a wick in the tubular member and extending into the secondary chamber for lubricating the bearing therein; and a sealing plug received by the filler opening and having an orifice which extends from the outside of the chamber to a point adjacent the center of the main chamber and above the lubricant level therein.

16. A lubricating device for a journal bearing comprising, in combination, a housing; a partition in the housing dividing the same into a main chamber containing a supply of lubricant and a secondary chamber and sealing one chamber with respect to the other chamber, the main chamber having a filler opening; a bearing in the secondary chamber; a tubular member having an open end secured in an opening of the partition, the other closed end of the tubular member dipping into the lubricant supply and having an orifice, said tubular member also having an opening in its annular wall adjacent the center of the main chamber and above the lubricant level therein; a wick in said tubular member and extending into the secondary chamber for lubricating the bearing therein; and a screw plug received by the filler opening and having an orifice which extends to a point adjacent the center of the main chamber.

17. In a lubricating device, the combination of a lubricant containing chamber; a secondary chamber within the lubricant chamber, said lubricant chamber being of such shape that the level of a predetermined maximum lubricant supply therein is maintained a substantially uniform distance below the center of said lubricant chamber regardless of the position of the device; a tubular member providing the sole communication between the lubricant supply and the secondary chamber, said tubular member extending from the secondary chamber into the lubricant chamber and having an entrance at such a location therein as to communicate with the lubricant supply so long as the device is in such position that lubricant does not gravitate from the supply; and means providing a vent nearer the center of the lubricant chamber than the level of the lubricant supply therein.

18. In a lubricating device, the combination of a lubricant containing chamber; a secondary chamber within the lubricant chamber, said lubricant chamber being of such shape that the level of a predetermined maximum lubricant supply therein is maintained a substantially uniform distance below the center of said lubricant chamber regardless of the position of the device; a tubular member extending from the secondary chamber into the lubricant chamber and having a vent nearer the center of said lubricant chamber than the level of the lubricant supply therein, said tubular member being so located within the lubricant chamber that substantially an entire cross-sectional portion of said member is above the lubricant level regardless of the position of the device; and lubricant conveying means in the tubular member.

19. In a lubricating device, the combination of a lubricant containing chamber; a secondary chamber within the lubricant chamber, said lubricant chamber having a filler opening and being of such shape that the level of a predetermined maximum lubricant supply therein is maintained a substantially uniform distance below the center of said lubricant chamber regardless of the position of the device; a tubular member extending from the secondary chamber into the lubricant chamber and providing the sole communication between the lubricant supply and the secondary chamber, said tubular member being so located within the lubricant chamber that substantially an entire cross-sectional portion of said member is above the lubricant level regardless of the position of the device; and an orificed plug for sealing the filler opening, the orifice extending nearer to the center of the lubricant chamber than the level of the lubricant supply therein.

20. In a lubricating device, the combination of a lubricant containing chamber; a secondary chamber within the lubricant chamber, said lubricant chamber having a filler opening and being of such shape that the level of a predetermined maximum lubricant supply therein is maintained a substantially uniform distance below the center of the lubricant chamber regardless of the position of the device; a tubular member extending from the secondary chamber into the lubricant chamber and having a vent nearer the center of said lubricant chamber than the level of the lubricant supply therein, said tubular member being so located within the lubricant chamber that substantially an entire cross-sectional portion of said member is above the lubricant level regardless of the position of the device; lubricant conveying means in the tubular member; and an orificed plug for sealing the filler opening, said orifice extending nearer to the center of the lubricant chamber than the level of the lubricant supply therein.

ZERBE C. BRADFORD.